Dec. 17, 1968 H. H. FRANZ 3,416,577
VALVE FOR CONTAINER FILLING APPARATUS
Filed May 31, 1966

INVENTOR
HENRY H. FRANZ

BY *Kenyon, Palmer, Stewart & Estabrook*
ATTORNEY

United States Patent Office 3,416,577
Patented Dec. 17, 1968

3,416,577
VALVE FOR CONTAINER FILLING APPARATUS
Henry H. Franz, 3201 Falls Cliff Road,
Baltimore, Md. 21211
Filed May 31, 1966, Ser. No. 553,787
5 Claims. (Cl. 141—117)

ABSTRACT OF THE DISCLOSURE

An apparatus for filling containers with a liquid having a receptacle nozzle and a vent tube extending therethrough and into said receptacle. The vent tube is provided with a valve member for controlling the flow of fluid from the receptacle through said nozzle and a bellows member carried by said nozzle for controlling the level of the liquid in the vent tube.

---

The usual bottle-filling machine or apparatus consists of a tank or reservoir having a plurality of filling nozzles or tubes, each of which is provided with a closure valve to control the flow of milk or a liquid into a bottle or container. The milk or liquid is delivered to the container upon the raising or elevating of said container into sealing engagement with the lower end of the filling nozzle or tube, which action usually results in unseating the valve and permitting the fluid from the tank or reservoir to flow into the bottle or container. The filling nozzle or tube usually has associated therewith a vent tube or passage that communicates with the space above the liquid in the tank or reservoir so that as the fluid flows into the bottle or container, the air contained therein will flow through the vent tube or passage and into the space above the liquid in the tank. In an apparatus or machine of this type, it is customary to employ what is commonly referred to as either the "gravity" type or the "vacuum" type of bottle or container filling apparatus. In the first type, the interior of the tank or reservoir is maintained at atmospheric pressure while in the vacuum type of bottle or container filling apparatus, the air space above the liquid in the tank or reservoir is under a pressure less than atmospheric pressure.

In the "gravity" type of container or bottle filling apparatus, the delivery of milk or a fluid through the filling nozzle or valve from the tank or reservoir into the container or bottle will force any air within the container or bottle to flow through the vent tube extending through the filling nozzle or valve and as the container or bottle becomes filled, liquid will flow up into the vent tube or passage. Thus, as the container or bottle is filled and same is removed from the filling tube or valve, the milk or fluid contained within the vent tube will then drop into the container or bottle and complete the filling of the container or bottle by filling the space or area formerly occupied by the lower end of the filling tube or valve part that projected into the container or bottle. In the vacuum type of container or bottle filling apparatus, the lower end portion of the filling nozzle or valve structure does not extend into the container or bottle any great distance so as to effect a displacement of the fluid therein. Thus, as the container or bottle is filled and removed from the filling tube, which action permits the valve member to seat and stop the flow of milk or liquid from the tank or reservoir, the vacuum pressure within said tank or reservoir will withdraw into the tank or reservoir the fluid contained in the vent tube or passage.

The container or bottle that is customarily employed with a filling apparatus of the vacuum type is normally sufficiently rigid and strong enough to withstand the vacuum or sub-atmospheric pressure that is maintained within the space above the liquid in the tank or reservoir so as not to suffer any damaging effects during the filling operation. In recent times, however, the type of container has changed from the conventional milk bottle to a paper or cardboard carton and to a relatively thin flexible plastic type of container that is readily capable of receiving and holding a fluid, such as milk, when said container is subjected to the normal and customary usage. The economics associated with a container of the plastic type are such as to make it highly desirable to be able to use such a container with a filling nozzle or valve apparatus of the type that is in present day usage. It has been found, however, that in order to be able to use such a plastic container that the vacuum pressure maintained within the tank or reservoir would have to be reduced from that which is normally maintained in the filling of a conventional bottle or cardboard carton. If the same vacuum pressure were to be maintained in the tank or reservoir when using a plastic container, the container would collapse or become distorted during the venting thereof so as to be incapable of receiving the milk or fluid from the tank or reservoir. It, thus, becomes essential that the vacuum pressure be reduced in the tank or reservoir in order to accommodate a plastic type container and yet maintain sufficient vacuum pressure within the tank or reservoir in order to withdraw any milk or fluid that might be contained in the vent tube or passage after the container had been filled and removed from the filling nozzle or tube.

One of the objects of the present invention is to provide an improved filling nozzle or valve of the open vent tube type whereby the vacuum pressure within the tank or reservoir may be reduced to permit the use of thin flexible plastic containers.

Another object is to provide a filling nozzle or valve which permits uniform and accurate filling of various types of containers.

A further object is to provide a filling nozzle or valve in a vacuum type of apparatus for filling containers wherein foaming of the liquid is reduced and said nozzle or valve is dripless.

Other objects are to provide a filling nozzle or valve which is readily adaptable for use with various types of containers, which can be readily removed from the apparatus or machine for cleaning and which is economical of manufacture.

Other objects and advantages more or less ancillary to the foregoing in the manner in which all of the various objects are realized will appear in the following description, which, when considered in connection with the accompanying drawing, sets forth the preferred embodiment of the invention.

Referring to the drawings wherein the preferred embodiment is shown:

Figure 1:
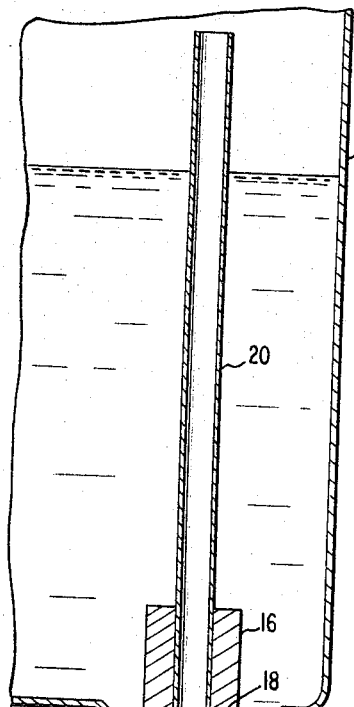
FIGURE 1 is a fragmentary view partly in section of a container filling machine showing a filling nozzle or valve embodying the present invention.

Referring to the drawing there is shown in FIGURE 1 a portion of a tnak or reservoir 10, which contains a suitable liquid, such as milk, that is to be delivered to various and sundry types of containers for filling same. The tank or reservoir 10 is provided with a conventional cover or lid, not shown, for effectively sealing and closing said tank or reservoir to permit the maintaining of a subatmospheric pressure therein. The lower or bottom surface of the tank or reservoir 10 has formed integrally therewith a depending filling tube or nozzle 12 that has, on its inner surface at its juncture with the bottom of the tank, an annular projection 14 which constitutes a valve seat. The seat 14 has associated therewith an annular inlet or filler valve 16 which is provided on its lower surface with an annular groove for the reception of a resilient sealing ring 18 that engages the seat 14 to provide an effective seal between said seat and valve member. The valve member 16 has extending therethrough a vent tube or pipe 20 that is of such a length as to project from the valve member upwardly above the level of the liquid in the tank or reservoir 10 and which terminates within the air space between the cover and liquid in the tank as shown in FIGURE 1. The vent tube 20 also projects from the valve member 16 through the filling tube or nozzle 12 and terminates at a point slightly below the end of said filling tube or nozzle. The lowermost end portion of the vent tube or pipe 20 is provided with an enlarged bead or projection 22 which is formed with an undulating surface 24 that acts as a discharge baffle and tends to aid in materially restricting the foaming action of the fluid during the filling of a container.

The external diameter of the vent tube 20 is considerably less than the internal diameter of the filling tube or nozzle 12 so that an annular discharge passageway 26 is provided throughout the length of the filling tube or nozzle 12. The vent tube 20 has formed on the external surface thereof intermediate the valve member 16 and the projection 22 one or more members 28 which may be in the form of protuberances or ribs.

The filling tube or nozzle 12 has formed on the external surface thereof an annular flange or abutment 30, the lower surface of which in conjunction with the end portion of filling tube or nozzle 12 defines an annular seat 32 for the reception of the upper ring-like portion 34 of a bellows or diaphragm member 36. The bellows 36 is provided with a lower ring-like element 38 which with the upper ring portion provide the bellows with a central chamber or compartment 39. The lower ring element 38 has secured to its inner surface thereof an annular nipple-like member 40, which has an internal diameter slightly larger than the greater external diameter of the projection 22 formed on the lower end of the vent tube 20. Thus, when the bellows-like element 36 is in its normal or extended position, such as shown in FIGURE 1, there is provided a small passageway between the inner surface of the nipple member 40 and the projection 22 on the lower end of the vent tube 20.

Figure 3:
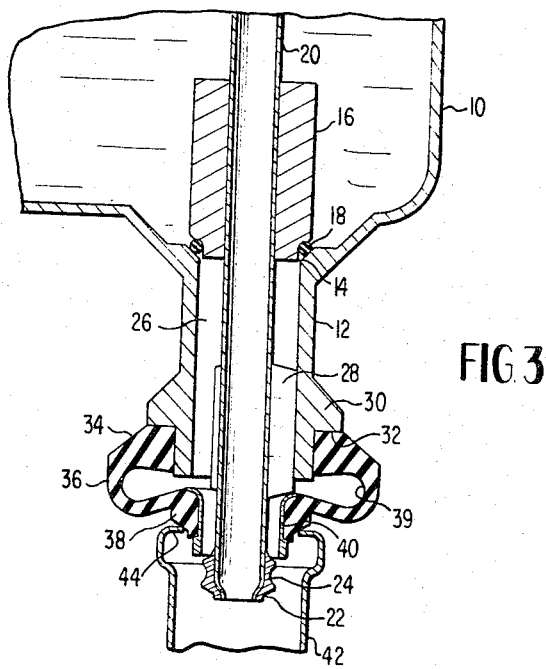
FIGURE 3 is a fragmentary sectional view of the container filling apparatus shown in FIGURE 1 illustrating the filling nozzle or valve in a partially operative state.

In the operation of filling containers or bottles, a conventional mechanism such as a filling or lifting platform, not shown, is employed to support the container 42 for the purpose of elevating and lowering same with respect to the filling tube or nozzle 12. The raising of the container 42 by the filling platform will bring the annular lip 44 of the container into sealing engagement with the lower ring-like element 38 of the bellows or diaphragm member 36. The continued movement of the lifting or filling platform causes the ring-like element 38 and the nipple member 40 to be elevated resulting in an initial compression of the bellows member 36 to the point wherein the upper edge of the nipple member 40 engages the member 28 on the vent tube 20, as shown in FIGURE 3. A further upward movement by the lifting platform serves to raise the vent tube 20, through the engagement of the nipple member 40 with the member 28, until the upper edge of the nipple-like member 40 contacts the lower edge of the filling tube or nozzle 12 at which time the filler valve 16 will have been raised from its seat 14 to permit the flow of liquid from the reservoir 10 through the annular discharge passageway 26 of filling tube or nozzle 12 and the nipple-like member 40 into the container 42, FIGURE 4. It is to be noted that the liquid flowing through the passageway 26 and the nipple member 40 will tend to strike the bead or projection 22 provided on the lower end of the vent tube 20 and due to the undulating surface provided thereon, the liquid will be directed radially towards the sides of the container in order to minimize any foaming tendency of the liquid in entering the container. During the filling of the container 42, the air that is contained therein is expelled through the open vent tube 20 and any foam that might be produced during the filling of the container will tend to rise through the vent tube. As the container 42 becomes filled, the liquid will enter the vent tube 20 and rise to the level of the liquid in the reservoir or tank 10.

Upon the filling of the container 42, the movement of the lifting or filling platform is reversed so as to lower the container with respect to the filling tube or nozzle 12. As the container 42 descends, the bellows or diaphragm member 36 will expand from the position shown in FIGURE 4 to that shown in FIGURE 3, which movement will permit the vent tube 20 to move downwardly in the filler tube so that the valve 16 is lowered and the resilient ring 18 is brought into sealing engagement with the seat 14 thereby closing the reservoir or tank against further flow of liquid through the passageway 26. The lowering of the container permits a spring-like expansion on the part of the bellows or diaphragm member 36 which creates a suction action by the bellows so that liquid from the vent tube 20 and from the top of the container 42 will be drawn through the nipple-like member 40 and into the chamber 39 of the bellows. This suction action causes the liquid within the vent tube 20 to be lowered to a point or level in the passageway 26 that is below the valve seat 14 at which time the container 42 would be completely lowered from the ring-like element 38 resulting in a withdrawal of the lowermost end portion of the vent tube from the container as shown in FIGURE 1. At the moment that the container is moved out of engagement with the ring-like element 38 and away from the lower end of the vent tube 20, the vacuum in the reservoir 10 between the top of the container and the level of the liquid need be only greater than the distance from the lower end of the vent tube 20 to the level of the liquid in said vent tube in order to effectively draw the liquid through the vent tube and into the tank or reservoir 10 as the lower end of the vent tube 20 upon the removal of the container 42 is open to the atmosphere.

Figure 4:
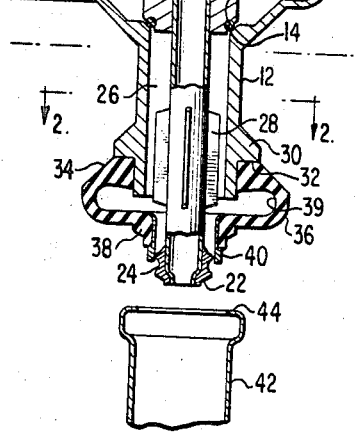
FIGURE 4 is a view similar to FIGURE 3 showing the filling nozzle or valve in a fully opened position.
Figure 2:
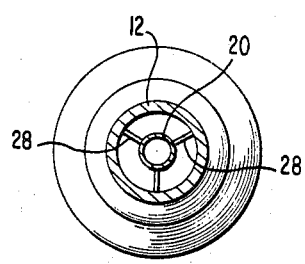
FIGURE 2 is a horizontal sectional view of a portion of the filling nozzle or valve, the view being taken on the line 2—2 of FIGURE 1.

Upon the removal of the container 42 from the filling or lifting platform, another container is positioned thereon and the above-described filling operation is repeated. In this connection, it will be noted that as a subsequent container is moved upwardly into engagement with the ring-like element 38 of the bellows or diaphragm member 36 and continued movement of the container causes a collapsing or compressing of the bellows-like element, the liquid contained in the chamber 39 will be delivered into said container through the nipple-like element 40 and this initial delivery of fluid or liquid into the container will occur as the bellows-like element is being compressed from the position shown in FIGURE 3 to that as shown in FIGURE 4. In the present invention, action of the bellows or diaphragm member 36 in withdrawing liquid from the upper end portion of the container and from the vent tube 20 as the container is being lowered with respect to the filling tube or nozzle permits the liquid in the vent tube to be brought to a very low point in said tube so that only a relatively small vacuum is required to be maintained in the upper portion of the tank 10 in order to effect a withdrawal of the liquid in the vent tube upon the removal of the container from the filling tube or nozzle. This is extremely effective in permitting the use of thin flexible plastic-like containers as the maintaining of a relatively high vacuum pressure within the space between the level of the liquid in the container 10 and the top of said container would result in a substantial collapsing of the container as it is elevated and brought into initial sealing engagement with the ring-like element 38 on the bellows or diaphragm member 36. However, through the use of a relatively low vacuum within the head space in the container or reservoir 10, the filling tube or valve device of the present invention readily permits the use of such types of containers as well as use of containers formed from cardboard or the like. In addition, the relatively small spacing between the inner surface of the nipple-like element 40 and the outer surface of the bead or projection 22 on the lower end of the vent tube 20 tends to materially aid in the retention of the fluid within the bellows or diaphragm chamber and permits this fluid to be drawn into said bellows or diaphragm by the suction action created upon the expansion of the bellows-like member to its initial or normal position. This suction-like action of the bellows member in permitting the fluid to be withdrawn from the vent tube 20 and the consequent lowering of the fluid in the vent tube just prior to the final separation of the container from the ring-like element 38 is of particular importance as such action results in a material reduction in the head of fluid that is retained within the vent tube at the time that the container is finally separated from the ring-like element 38. It is due to the relatively small amount of liquid within the vent tube 20 that a reduced vacuum may be maintained within the head space of the reservoir 10 and yet the filling valve of the present invention is readily adaptable for use in the filling of various types of containers.

Although the foregoing description is necessarily of a detailed character, in order that the invention may be completely set forth, it is to be understood that the specific terminology is not intended to be restrictive or confining and that various rearrangements of parts and modifications of detail may be resorted to without departing from the scope or spirit of the invention as herein claimed.

I claim:

1. Apparatus for filling a container with liquid from a reservoir having a depending nozzle comprising a valve seat formed on said nozzle, a valve member having a sealing ring engaging said seat to control the flow of liquid from the reservoir through said nozzle, a vent tube carried by said valve member and arranged to extend above the liquid level in the reservoir and through said nozzle, a member provided on said vent tube within said nozzle, an annular flange provided on the lower end of said nozzle and defining with said nozzle a seat, a bellows member having spaced upper and lower ring-like members defining a central chamber, the upper ring-like member of said bellows encircling said nozzle and mounted on said seat, an annular nipple-like member affixed to the inner surface of said lower ring-like member, said lower ring-like member engaged by a container for moving said lower ring member towards said upper ring member, said nipple member engaging said member to elevate said vent tube and valve member for delivering liquid to said container through said nozzle with the liquid rising in said vent tube to the level of the liquid in the reservoir upon the filling of container, said valve member engaging said valve sea close the flow of liquid through said nozzle upon movement of the container and the lower ring mem away from the upper ring member, said bellows mem expanding upon the lowering of the lower ring mem to create a suction and draw liquid from the vent tube i said central chamber to where the level of the liquid said vent tube is at a point lower than the level of liquid in the reservoir.

2. Apparatus as set forth in claim 1 wherein the lov end of said vent tube is provided with an annular bead tl lies within said nipple member in closely spaced relati thereto.

3. Apparatus as set forth in claim 2 wherein said a nular bead is formed with an undulating surface for recting fluid flowing through said nozzle towards the sid of the container.

4. Apparatus as set forth in claim 1 wherein said ve tube is subjected to a vacuum in said container for wit drawing the liquid remaining therein upon the removal the container from the lower ring-like member.

5. Apparatus for filling a container with liquid from reservoir having a depending nozzle comprising a vei tube extending through said nozzle and projecting abov the liquid level of said reservoir, a valve member on sai tube for controlling the flow of liquid through said nozzl a resilient bellows-like member mounted on the lower en of said nozzle and surrounding the lower end of said tube a member provided on said tube within said nozzle, mean carried by said bellows and engageable with said membe for raising said tube, and valve member upon the engage ment of said bellows by a container for delivering fluic through said nozzle into said container, said tube venting said container and permitting fluid to flow therein to th level of the fluid in the reservoir, said bellows expanding upon the removal of the container therefrom and the clos ing of said valve, the expansion of said bellows creating a suction to withdraw fluid from said tube whereby the level of the fluid in said tube is lowered to a point below said valve.

References Cited

UNITED STATES PATENTS

| 2,127,892 | 8/1938 | Stewart | 141—117 |
| 2,364,400 | 12/1944 | Stewart et al. | 141—286 X |
| 2,499,149 | 2/1950 | Lippold | 141—117 |
| 2,711,279 | 6/1955 | Day et al. | 141—295 X |
| 2,904,082 | 9/1959 | Enock | 141—295 |

FOREIGN PATENTS

| 665,635 | 1/1952 | Great Britain. |
| 665,636 | 1/1952 | Great Britain. |

HOUSTON S. BELL, JR., *Primary Examiner.*

U.S. Cl. X.R.

141—293, 295, 351